United States Patent [19]
Caudroy

[11] Patent Number: 5,204,684
[45] Date of Patent: Apr. 20, 1993

[54] DEVICE FOR DIGITAL TELEMETRY AND A RADAR SYSTEM INCORPORATING SUCH A DEVICE

[75] Inventor: Yves Caudroy, Plessis Robinson, France

[73] Assignee: Thomson - CSF, Paris, France

[21] Appl. No.: 700,941

[22] Filed: Oct. 3, 1984

[30] Foreign Application Priority Data

Oct. 7, 1983 [FR] France ................... 83 16029

[51] Int. Cl.⁵ .............................................. G01S 7/22
[52] U.S. Cl. ..................................... 342/182; 342/195
[58] Field of Search ............. 343/5 EM; 342/182, 183

[56] References Cited

U.S. PATENT DOCUMENTS

| | | | |
|---|---|---|---|
| 3,134,974 | 5/1964 | Orenstein | 342/135 |
| 3,787,847 | 1/1974 | Danzer | 343/5 EM X |
| 4,126,858 | 11/1978 | Wiener | 343/5 EM |
| 4,190,834 | 2/1980 | Doornink | 342/183 X |
| 4,205,313 | 5/1980 | Pease | 342/182 |
| 4,211,982 | 7/1980 | Smith | 342/183 X |

Primary Examiner—T. H. Tubbesing
Attorney, Agent, or Firm—Cushman, Darby & Cushman

[57] ABSTRACT

A digital telemetry device includes synchronous counters monitored by a clock. The counters are connected, on the one hand, to two comparators and, on the other hand, to a buffer memory. The comparators generate a telemetry mark which makes it possible to form a tracking window. The buffer memory stores or transmits the value of the counters whenever it receives an echo presence signal.

The comparators work with most significant bits (MSB) to generate the telemetry mark, whilst the buffer memory works with least significant bits (LSB) which make it possible to determine the position of the target in relation to the center of the telemetry mark, for example by the use of a "complement-on-two" code.

14 Claims, 6 Drawing Sheets

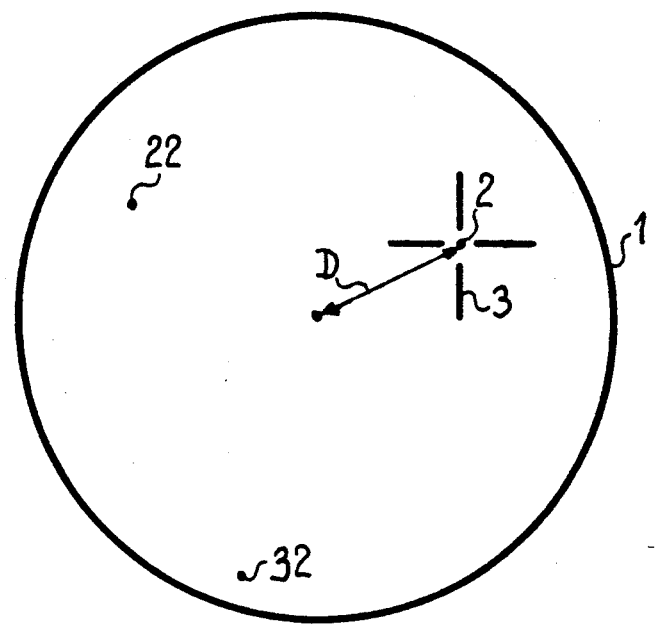
FIG_1
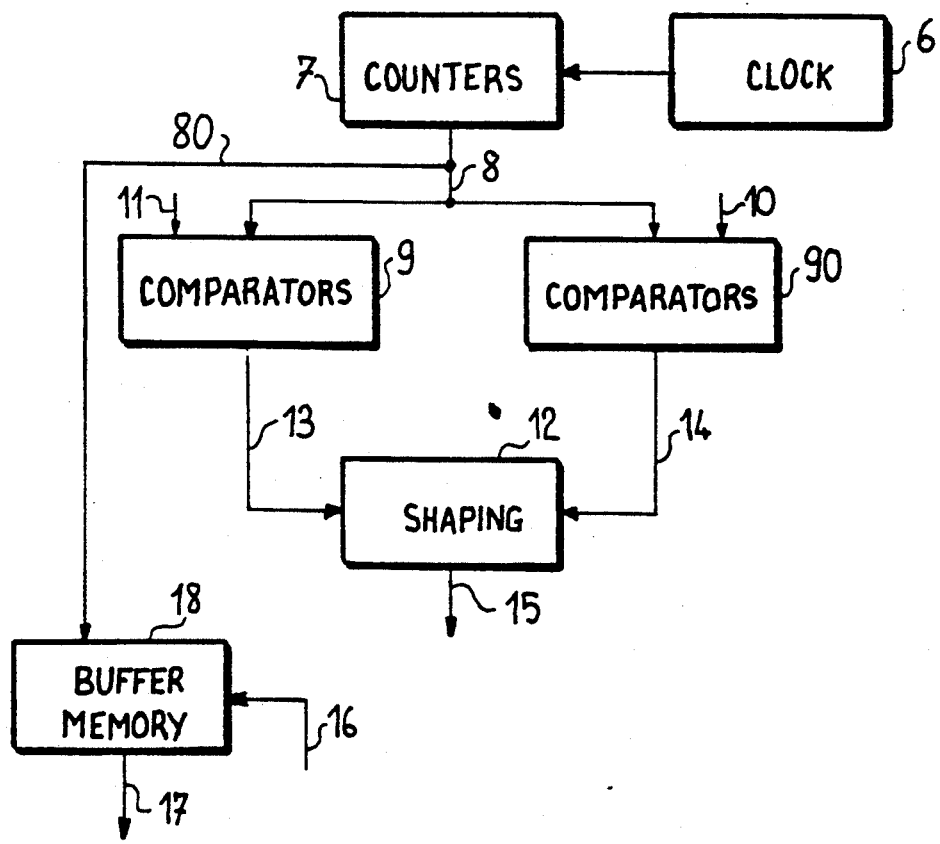
FIG_2

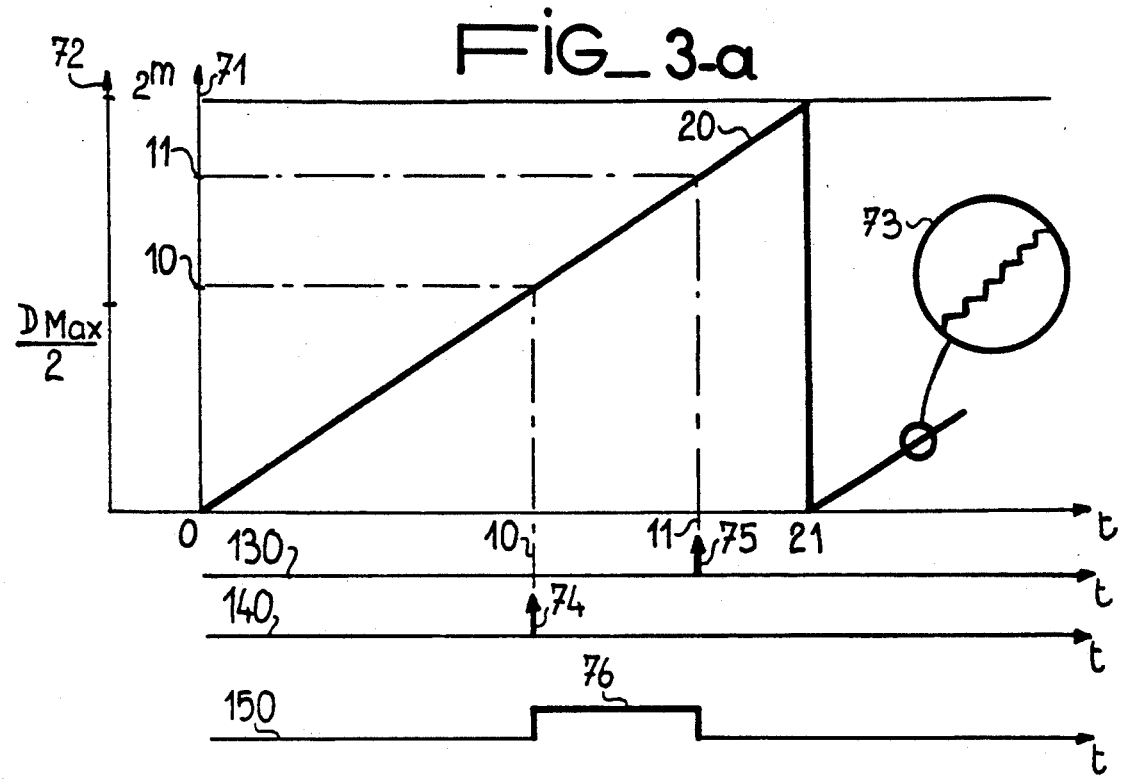
FIG_3-a
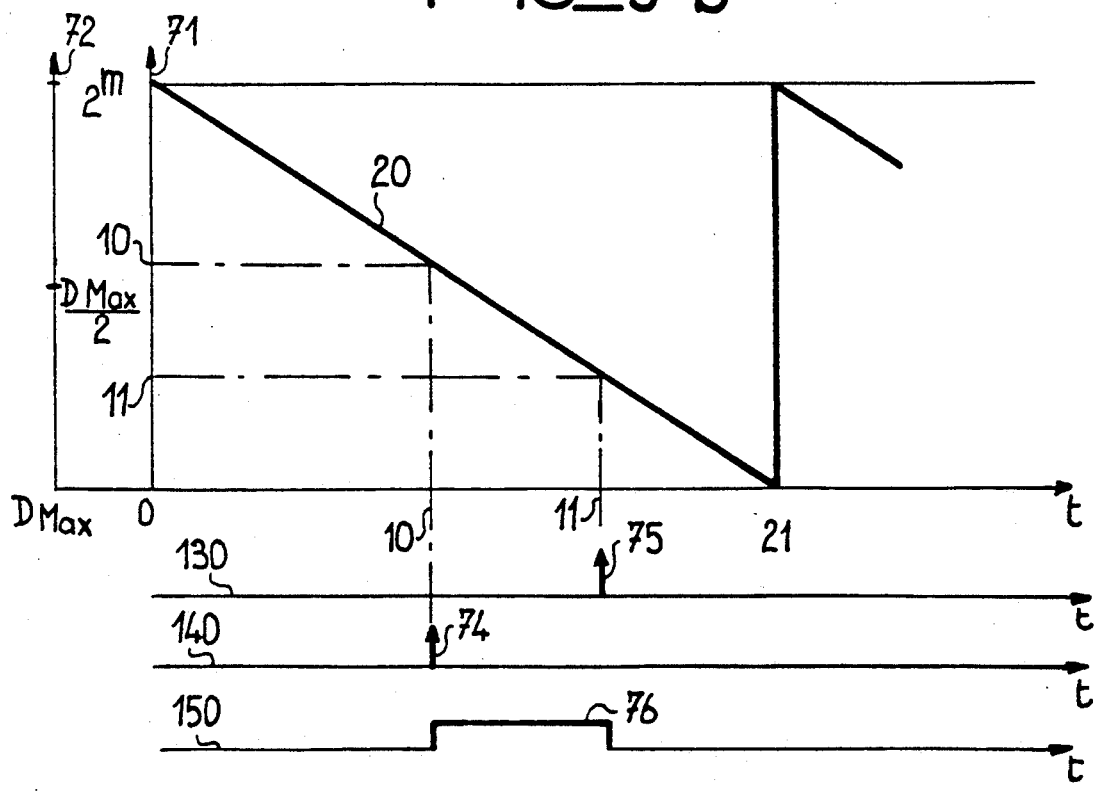
FIG_3-b

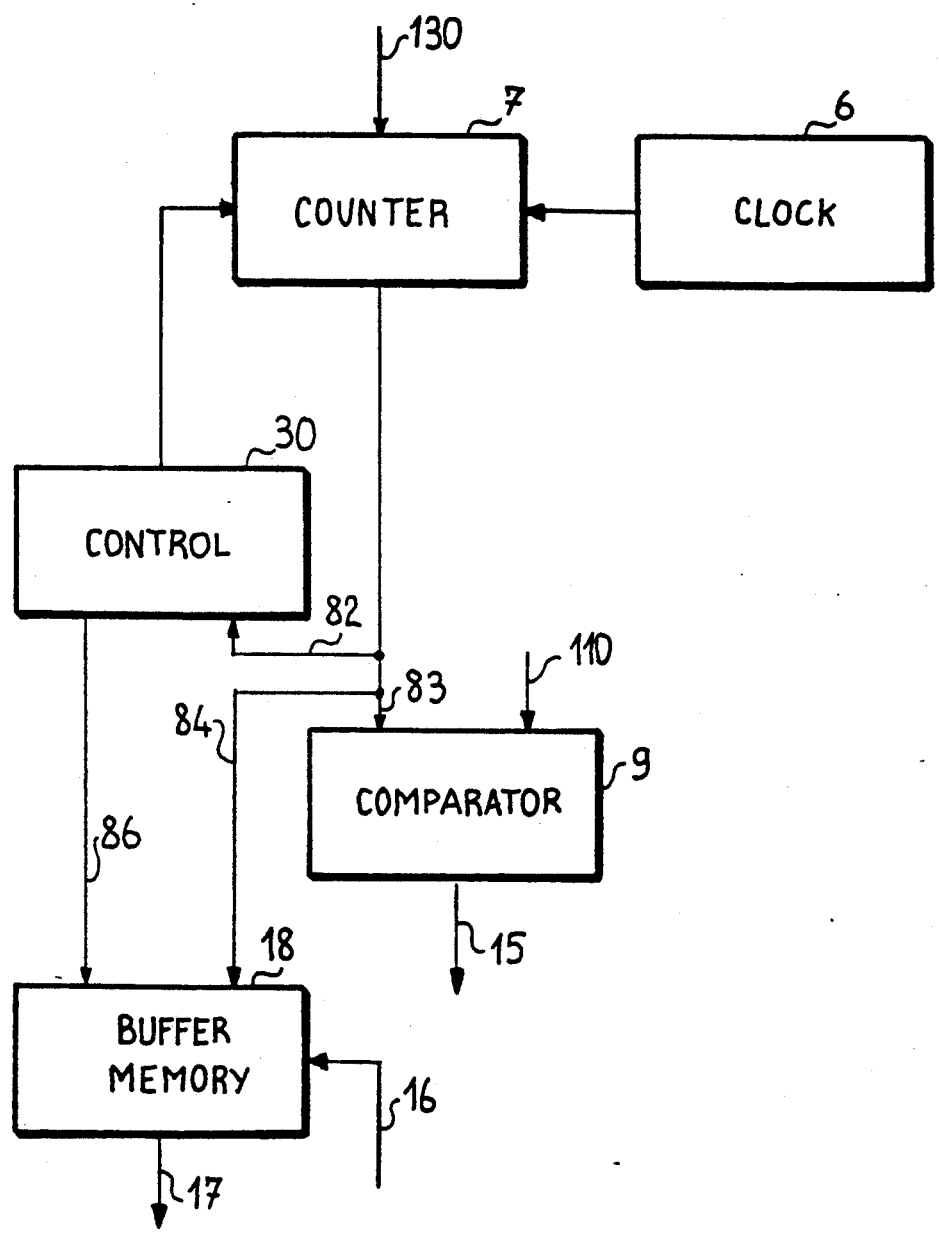
FIG_4

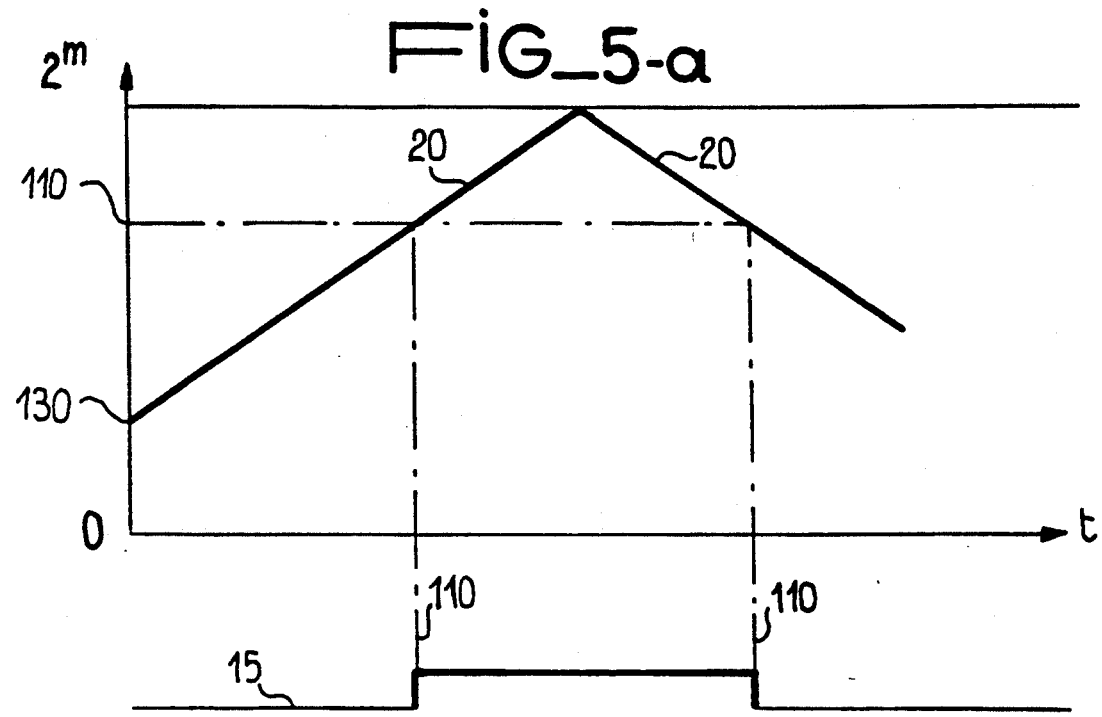
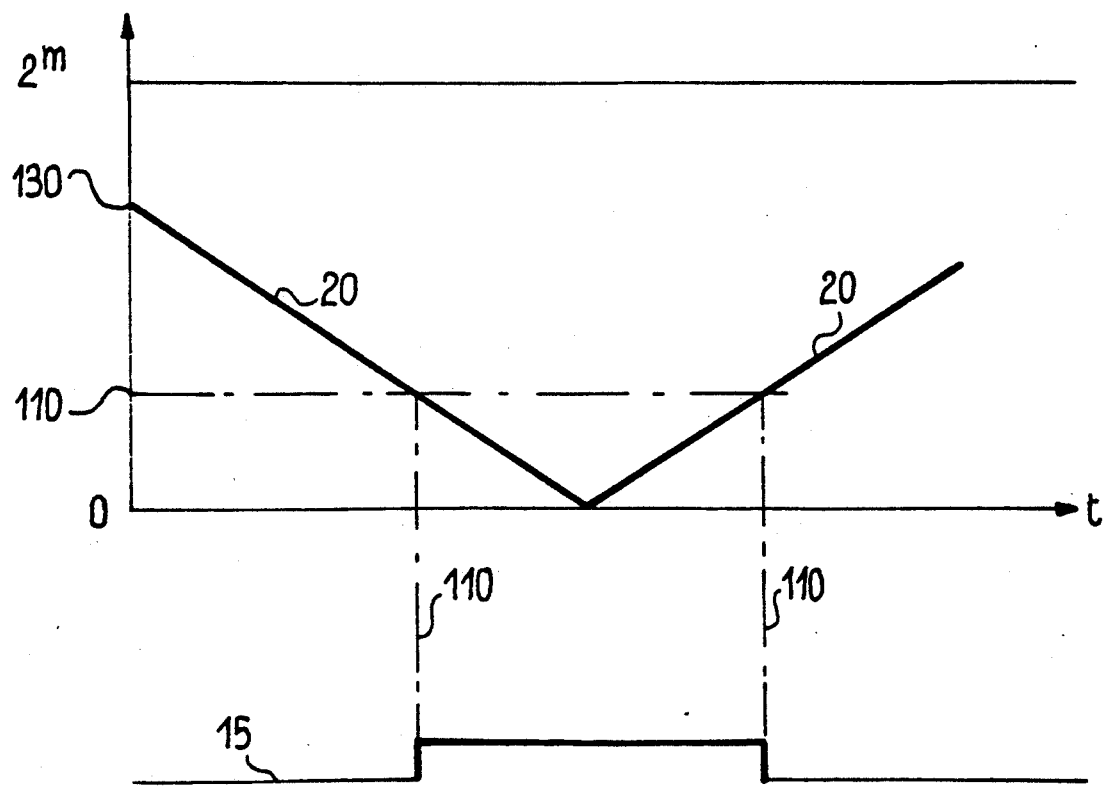

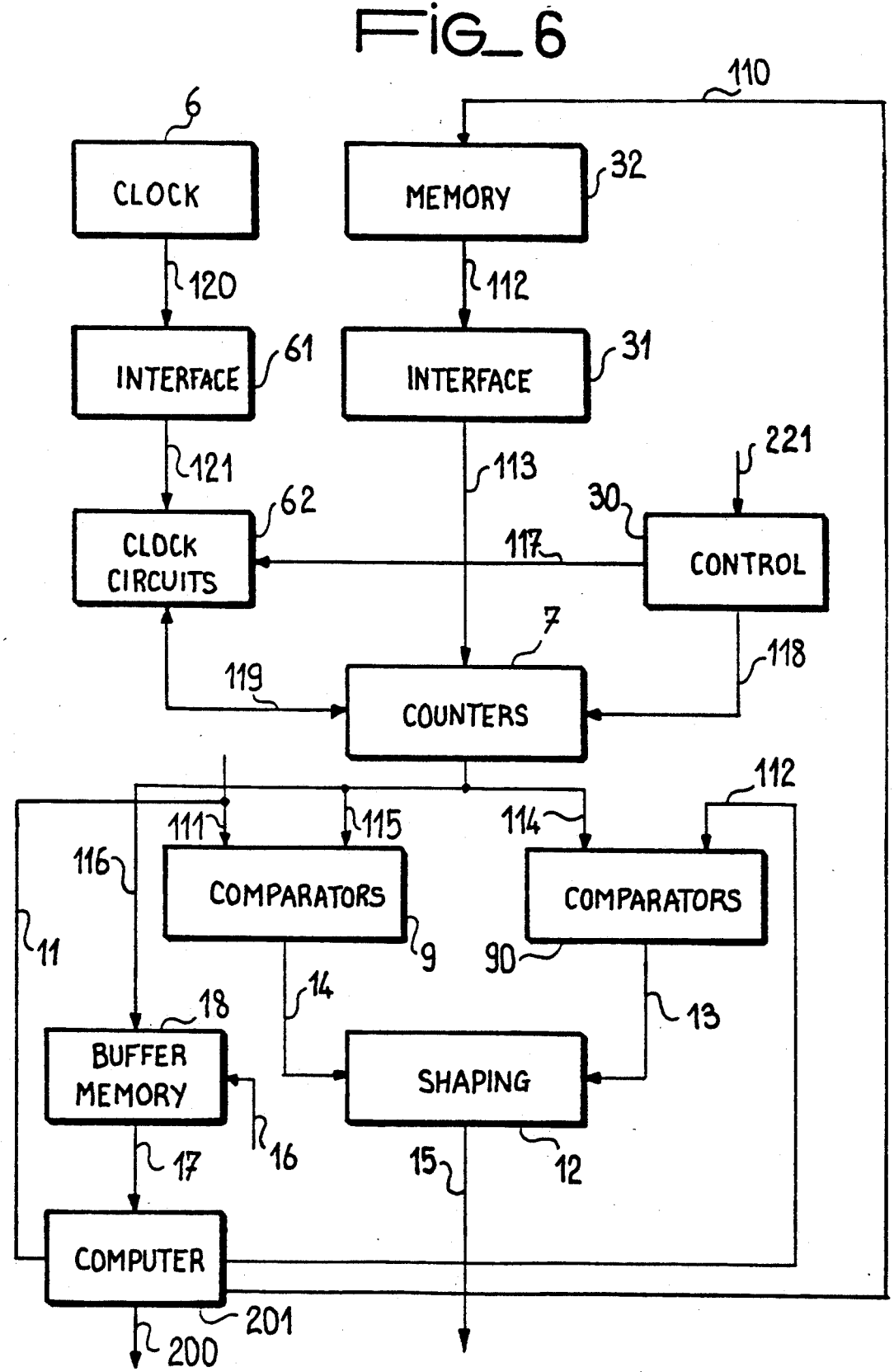
FIG_6

FIG_7-a
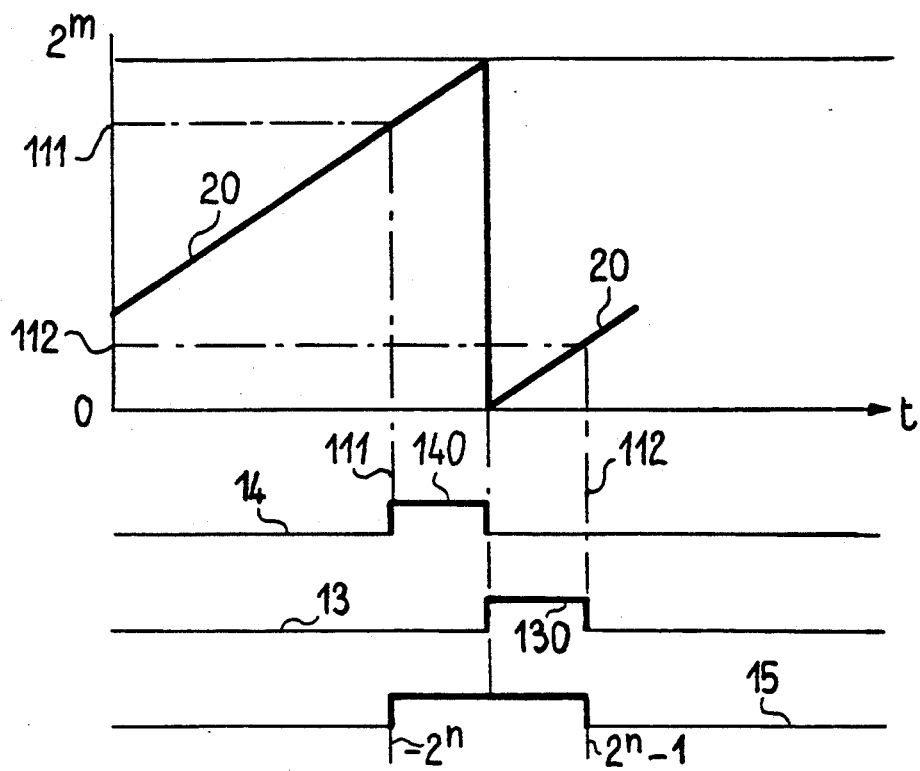
FIG_7-b
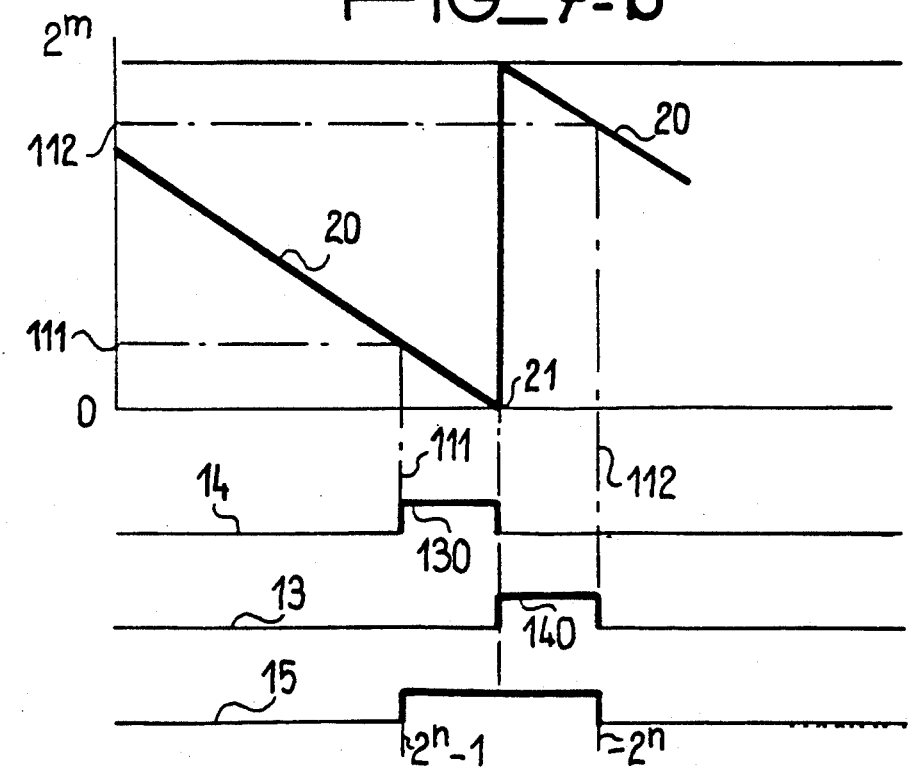

DEVICE FOR DIGITAL TELEMETRY AND A RADAR SYSTEM INCORPORATING SUCH A DEVICE

BACKGROUND OF THE INVENTION

The present invention relates mainly to digital telemetry devices, particularly for radar, laser telemetry and sonar.

It is useful, in telemetry devices, to increase the range resolution. Now $D = v \times t$, D being the range to be measured, v being the wave propagation speed and t being time. Thus, an increase in the range resolution takes place via an increase in time resolution and therefore via an increase in the working speed of the circuits of such devices.

SUMMARY OF THE INVENTION

The device according to the invention proposes to reduce the number of circuits working at high speed and/or to limit the number of bits to be processed by these circuits.

The invention relates mainly to a digital telemetry device which is characterized in that it incorporates, in particular, counting means synchronized by a clock and connected to at least one comparator generating a telemetry mark, and means making it possible to ascertain the value of the counting means at the moment of echo detection, this value containing the range information.

BRIEF DESCRIPTION OF THE DRAWINGS

Other advantages and characteristics of the present invention are described in the following exemplary embodiments and by means of the Figures in which:

FIG. 1 is an explanatory Figure;

FIG. 2 shows a block diagram of a digital telemetry device;

FIGS. 3a and 6 show explanatory graphs relating to the device of FIG. 2;

FIG. 4 shows a block diagram of a digital telemetry device;

FIGS. 5a and b show explanatory graphs relating to the device of FIG. 4;

FIG. 6 shows a block diagram of an embodiment of a digital telemetry device according to the invention;

FIGS. 7a and b show explanatory graphs relating to the device of FIG. 6.

In what follows, the invention will be explained in relation to a radar system, although it goes without saying that its use in other devices, such as, for example, sonars or laser range finders, does not depart from the scope of the present invention.

In FIGS. 1 to 7a and b, the connecting lines and the signals which they transmit bear the same reference symbols. Likewise, in FIGS. 1 to 7a and b, the same elements bear the same reference symbols.

FIG. 1 illustrates the video screen 1 which has three echoes of targets 2, 22 and 32. The radar operator wishes to ascertain accurately the distance separating him from one of the targets, for example that represented by the echo 2. The operator centers a reference mark 3, called an alidade or cursor, on the echo of the target 2, the radar being changed to the "target" designation mode. The radar antenna then executes an angular scan only in a restricted zone around the target. A range window sufficiently wide to allow the video carrier and the signal corresponding to the target echo 2 to pass makes it possible to analyze the radar video carrier and extract the position of the echo. The radar is then changed to tracking mode and a smaller range window is positioned on the echo, this window allowing a more detailed analysis of the video carrier, given the restricted number of information items to be processed.

Various embodiments of circuits making it possible to generate the tracking window, hereinafter called the telemetry mark, and to carry out range measurements, as well as the modes of operation of these circuits, are explained below.

In FIG. 2, a digital telemetry device can be seen. A clock 6 controls a counting circuit 7. The counting circuit 7 is connected, on the one hand, by a line 80 to a buffer memory 18 and, on the other hand, by lines 8 to comparator circuits 9 and 90. The comparator circuit 9 receives a signal 11 from a computer not shown in the Figure. The comparator circuit 90 receives a signal 10 from a computer not shown in the Figure. The comparator circuit 9 is connected to a shaper circuit 12 by a line 13. The comparator circuit 90 is connected to the shaper circuit 12 by a line 14. The shaper circuit 12 generates a signal 15 hereinafter called a telemetry mark. The buffer memory 18 receives a signal 16 from an echo detection device not shown in the Figure. The buffer memory supplies to the computer, not shown in FIG. 2, a signal 17 representing the range of the target.

The device of FIG. 2 can operate either in count-up mode illustrated in FIG. 3a or in count-down mode illustrated in FIG. 3b.

In count-up mode, starting from the value 0, at each pulse of the clock 6 the counter 7 adds one unit to the preceding value. At each clock pulse, the values of the counter are transmitted, on the one hand, by the line 80 to the buffer memory 18 and, on the other hand, by the line 8 to the comparator circuits 9 and 90. On the other hand, the comparator circuits 9 and 90 receive from the computer, not shown in FIG. 2, the digital values 11 and 10 respectively, which indicate the end and start of the telemetry mark, making it possible to generate the tracking window. The values 11 and 10, called respectively the start reference and end reference of the telemetry mark, are computed so as to obtain good positioning of the tracking window, the dimensions of the tracking window being, preselected. When the value of the counter 7 coincides with the value 10, the comparator 90 transmits a signal via the line 14 to the shaper circuit 12. When the value of the counter 7 coincides with the value 11, the comparator circuit 9 sends a signal via the line 13 to the shaper circuit 12. An echo detection device, not shown in the Figure, having detected the echo of the target, sends a signal 16 to the buffer memory 18. The memory 18 transmits the value 17 of the counter at that moment, this value representing the range of the target. The computer determines the range of the target, in particular by means of scale conversions. The computer generates new digital values 11 and 10 corresponding to the new end and start references of the telemetry mark, in such a way that the target is located in the center of the tracking window. The counting circuit 7 works on m bits. When it reaches the value of $2^m$, this corresponds to the range of the radar in tracking mode. The counter 7 is reset to zero.

In count-down mode, the counter 7 starts from the value of $2^m$ and at each pulse of the clock 6 subtracts "1" from the preceding value. The value contained in the buffer memory 18 at the moment of detection of the echoes 16 represents the range of the target.

FIGS. 3a and b illustrate the modes of operation of the device of FIG. 2.

In FIG. 3a, the value 20 of the counter 7 as a function of time t can be seen in count-up mode. The value 20 of the counter 7 as a function of time is a digital sawtooth. It can be seen from the magnification 73 that the value 20 is composed of a sum of discrete numbers. A distance scale 72 corresponds to a scale 71 for the value 20 of the counter 7. The value zero corresponds to a minimum distance of the tracking window, and the value $2^m$ corresponds to the maximum distance $D_{MAX}$ of the tracking window. The curves 130, 140 and 150 correspond respectively to the signals supplied along the lines 13, 14 and 15 as a function of time. When the start reference of the telemetry mark 10 and the value of the counter 7 coincide with one another, the comparator 90 supplies a pulse 74 along the line 14. When the end reference of the telemetry mark 11 and the value of the counter 7 coincide with one another, the comparator 9 supplies a pulse 75 along the line 13. The shaper circuit 12 supplies along the line 15 a telemetry mark located in time between the pulse 74 and the pulse 75.

FIG. 3b illustrates how the device of FIG. 2 operates in count-down mode. In this case, the value $2^m$ of the counter 7 on the axis 71 corresponds to the minimum distance of the tracking window on the scale 72, and the value "0" of the counter 7 corresponds to the maximum distance $D_{MAX}$.

In FIG. 4, a digital telemetry device, which generates a triangular sawtooth in count-up/count-down or count-down/count-up, can be seen. The device incorporates a counting circuit 7 controlled by a clock 6. The counting circuit 7 can operate in count-up or count-down mode, and this mode can be selected by a control circuit 30. The counter is connected to the control circuit 30 via the line 82. The counter 7 is connected to a comparator circuit 9 via a line 83. The comparator receives a signal 110 from a computer not shown in the Figure. The comparator circuit 9 supplies a signal which is the telemetry mark 15. The counting circuit 7 is connected via the line 84 to a buffer memory 18. The memory 18 is connected to the echo detection device, not shown in the Figure, by means of the line 16. The buffer memory is connected to the computer via the line 17. The control circuit 30 is connected to the computer by means of a line 86.

The counter 7 is preloaded with a number 130 of m bits as a function of the distance of the telemetry mark. In count-up/count-down mode, at each clock pulse the counter adds the value "1" to the value previously contained in the counter. The value of the counter is transmitted via the line 82 to the control circuit 30. When the value of the counter reaches $2^m$, the control circuit 30 makes the counter 7 change from count-up mode to count-down mode. The value of the counter 7 is sent to the comparator 9 via the line 83. On the other hand, the telemetry reference 110 is sent to the comparator 9. At each clock pulse, the comparator 9 compares the n most significant bits of the value of the counter 7 with the n bits of the reference of the telemetry mark 110. When the n most significant bits of the counter and the n most significant bits of the telemetry mark reference coincide with one another, the comparator sends a telemetry mark 15. The T least significant bits are transmitted via the line 84 to the buffer memory 18. The counter value is transmitted via the line 82 to the control circuit 30. When the value of the counter 7 reaches the value $2^m$, the control circuit 30 reverses the operating mode of the counter 7. If, for example, the counter 7 was in count-up mode, it changes to count-down mode. Along the line 86, the count-up mode or count-down mode of the counter 7 is communicated to the memory 18 by means of the control circuit 30. When an echo presence signal 16 is transmitted to the buffer memory 18, the latter stores and/or transmits the counter value at that moment and the value which is transmitted via the line 86 and which corresponds to the count-up or count-down state of the counting circuit 7. Knowledge of the state of the counter and of its value makes it possible to determine the range of the target. When, in count-down mode, the comparator 9 detects a coincidence between the value of the counter 7 and the reference 110, it generates a telemetry mark 15.

FIGS. 5a and b illustrate the modes of operation of the device of FIG. 4. The count-up/count-down operating mode of the device of FIG. 4 can be seen in FIG. 5a. Counting begins at a value 130 determined by the position of the target. The value generated by the counter in this case is a triangular sawtooth 20. When the counter value coincides with the reference signal 110, a telemetry mark is generated. The telemetry mark is located between the two moments of coincidence between the counter value and the reference 110.

The count-down/count-up operating mode of the device of FIG. 4 can be seen in FIG. 5b. In this case, the counter is preloaded to the value 130 and counts down to the value "0". When the value 20 and the reference 110 coincide with one another, the start of the telemetry mark 15 is generated. Beyond the value zero, the counter operates in count-up mode. When the reference 110 coincides with the value 20 of the counter, the end of the telemetry mark 15 is generated.

A particularly efficient embodiment of the device according to the invention can be seen in FIG. 6. To increase the range resolution of the telemetry device, there is an increase, in this non-limiting example, in the operating frequency of certain circuits. It has therefore been necessary to adopt for these circuits an Emiter Coupled Logic. Other circuits operate in TTL technology. Interface circuits have been provided. The device in FIG. 6 incorporates a clock 6 connected to an interface circuit 61 by means of a line 120. The interface circuit 61 is connected to the clock circuit 62 via the line 121. The clock circuit is connected to a group of synchronous counters 7 by means of a two-way line 119. A memory register 32 is connected to an interface circuit 31 by means of the line 112. The interface circuit is intended for matching the memory circuit designed according to TTL technology to the counting circuits 7 designed according to ECL technology. The interface circuit 31 is connected to the counting circuits 7 by means of the line 113. The control circuit 30 receives a synchronizing signal 221. The control circuit 30 is connected, on the one hand, via the line 117 to the clock circuit and, on the other hand, via the line 118 to the counters 7. The counters 7 are connected to the comparator 9 via the line 115 and to the comparator 90 via the line 114. On the other hand, the counting circuits 7 are connected to the buffer memory 18 by means of the line 116. The buffer memory receives an echo presence signal 16 from the echo presence detector which is not shown in the Figure. The buffer memory is connected to the computer 201 via the line 17. The comparator 9 receives, for example from the computer 201, the start references of the telemetry mark 11. The comparator 90 receives, for example from the computer 201, the stop reference of the telemetry mark 10. The memory 32 receives, for example from the computer 201, the new position of the center of the telemetry mark 110. The comparator circuit 9 is connected to the shaper circuit 12 by means of the line 14. The comparator circuit 90 is connected to the shaper circuit 12 by means of the line 13. The shaper circuit generates the telemetry mark 15.

The computer 201 computes the new position 110 of the telemetry mark 15. This value is transmitted to the memory 32. The memory 32 transmits this value to an interface circuit 31 via the line 112. The interface circuit 31 transmits this value to the counters 7 via the line 113. A control circuit 30 receives a synchronizing signal 221. It controls the operation of the counters 7 by means of the line 118 and of the clock circuit 62. The clock circuit 62 is operated by the clock 6 via the interface circuit 61 and the line 121. The counters 7 operate in count-up mode or in count-down mode. The counters 7 transmit the n most significant bits (MSB) to the comparator circuit 9 and 90 via the lines 115 and 114 respectively. The comparator 9 receives a value -REF 111, for example from the computer 201. The comparator 90 receives the value +REF 112, for example from the computer 201. The values 111 and 112 are fixed or can change during the use of the radar, to allow the size of the tracking window to be changed. The comparator 90 prepares half the telemetry mark when the n most significant bits transmitted via the line 114 coincide with the value 112. The counter 9 prepares the other half of the telemetry mark when the reference value 111 and the value of the counters which is transmitted via the line 115 coincide with one another. The two halves of the telemetry mark are transmitted via the lines 13 and 14 to the shaper circuit 12 which generates the telemetry mark 15. The counters 7 transmit to the buffer memory 18 via the line 116 the $m-n+1$ least significant bits (LSB) of the value of the counters. At each presence of echoes, the $m-n+1$ bits are stored in the buffer memory 18. These least significant bits are sufficient to characterize the relative distance of the echoes in relation to the center of the telemetry mark 15, for example in a "complement-on-2" code. In this code, the value "0" is associated with the center of the telemetry mark and numbers, the sum of which is equal to a fixed value, are associated with the values with an equal distance in relation to this center. For example, with the fixed value being equal to 10,000, the following codes are associated with the positions in relation to the center of the telemetry mark:

| Position in relation to the telemetry mark | Associated codes |
| --- | --- |
| −2 | 1110 |
| −1 | 1111 |
| 0 | 0000 |
| 1 | 0001 |
| 2 | 0010 |

The value contained in the memory 18 is transmitted via the line 17 to the computer 201 which determines the value of the distances 200 of the echoes.

The mode of operation of the device of FIG. 6 can be seen in FIGS. 7a and b.

The count-up mode is illustrated in FIG. 7a. The digital sawtooth 20 prepared by the counters 7 of FIG. 6 changes to the value zero at the center of the telemetry mark 15. By comparing the value of the counters 7 of FIG. 6 with the value 111, the comparator 9 prepares a first half of the telemetry mark 140. Likewise, by comparing the value 112 with the value 114 obtained from the counters 7 of FIG. 6, the comparator 90 prepares a second half of the telemetry mark 130. The shaper circuits 12 of FIG. 6 prepare the telemetry mark 15. The circuit 12 of FIG. 6 is a very simple circuit because it is confined to summing the two halves of the telemetry mark 140 and 130. The start of the telemetry mark 15 corresponds to a value $-2^{m-n}$ transmitted by the counters to the comparators, and the end of the telemetry mark 15 corresponds to a value of $2^{m-n}-1$.

FIG. 7b illustrates how the device of FIG. 6 operates in count-down mode. Starting from the value 110, the counter counts down to the value zero which corresponds to the center of the telemetry mark. The start $2^{m-n}-1$ of the telemetry mark corresponds to the value $2^{m-n}-1$ transmitted by the counters 7 of FIG. 6 to the comparators 9 and 90 of FIG. 6, and the final point of the telemetry mark corresponds to $-2^{m-n}$.

To determine the numbers of least significant bits (LSB) and most significant bits (MSB), the following formula can be used: Width of the tracking window = $(C/F)2^{m-n}$ C being the propagation speed of the radar waves in meters per second, F being the frequency of the clock signal 6 in Hertz, and m being the total number of counter bits. The number m depends on the range of the radar. For example, $m=16$ and $n=12$ can be used.

The circuit of FIG. 6 has many advantages. The device can achieve a high degree of accuracy which is proportional to the frequency of the clock 6. The counters always operate in the same mode, either count-up or count-down, thus preventing jitter.

The device is completely synchronous. The circuits designed according to ECL technology and working at high frequency are reduced to the counters 7 and to the buffer memory 18. The comparator circuits 9 and 90 are simplified because they work with a reduced number of bits. The references -REF 111 and +REF 112 applied to the comparators 9 and 90 are very simple to prepare since they are fixed values. The signal shaper circuit 12 is confined to a summing circuit. The device generates the relative distance of the echoes in relation to the center of the telemetry mark in terms of range error. Since the buffer memory 18 needs to store only a reduced number of bits serving to characterize the target ranges, it can be of reduced size. Thus, the devices of FIG. 6 do not possess circuits which are difficult to operate.

The most advantageous uses of the device according to the invention are in digital radar, sonar or laser telemetry. Another particularly advantageous use of the device is in the analysis of echoes characteristic of targets in radar or sonar systems. Such echoes characteristic of the target are called the radar signature or sonar signature.

I claim:

1. A digital telemetry device, comprising:
   clock means for providing a clock signal;
   counting means, synchronized by said clock signal, for providing a count signal including most significant bits (MSB) and least significant bits (LSB);
   comparator means for receiving said MSB and providing a telemetry signal corresponding thereto; and ranging means adapted for receiving a target echo detection signal and said LSB, and for providing a range signal corresponding to a range to the target.

2. Apparatus according to claim 1 wherein said ranging means includes buffer memory means for storing a value of said counting means at a moment when said target echo detection signal is received by said ranging means.

3. Apparatus according to claim 1 further including shaping circuit means, coupled to said comparator means, for generating a telemetry mark from said telemetry signal.

4. Apparatus according to claim 1 wherein said counting means operates on one of said count-up mode and count-down mode, and further including control means, coupled to said counting means and to said comparator means and to said ranging means, for controlling said counting means in either said count-up mode or said count-down mode.

5. Apparatus according to claim 1 wherein said counting means comprises means for counting in a first direction and then counting in a second direction during one ranging cycle.

6. Apparatus according to claim 1 wherein said ranging means comprises means for providing a range signal in terms of error in relation to a center of a telemetry mark defined by said telemetry signal.

7. Apparatus according to claim 1 wherein said counting means comprises ECL logic and wherein said ranging means includes a memory of TTL logic circuitry.

8. Apparatus according to claim 7 further including interfaced means for interfacing said ECL counting means with said TTL memory means.

9. Apparatus according to claim 7 wherein said comparator means comprises a first comparator providing a telemetry start signal, and a second comparator providing a telemetry stop signal.

10. Apparatus according to claim 1 wherein said ranging means includes a computer which provides a telemetry reference signal to said comparator means, and wherein said comparator means includes means for (a) comparing, at each pulse of said clock signal, said MSB with said reference telemetry signal, and (b) outputting said telemetry signal when said MSB and said reference telemetry signal coincide.

11. Apparatus according to claim 1 wherein said counting means is comprised of ECL circuitry, said comparator means is comprised of ECL circuitry, said ranging means includes a memory comprised of TTL circuitry, and further including interfaced means for connecting said TTL memory means to said ECL counter means.

12. A digital telemetry device, comprising:
counting means, comprised of ECL technology, for providing a count signal;
comparator means, comprised of ECL technology, for receiving said count signal and providing a telemetry signal corresponding thereto;
ranging means adapted for receiving a target echo detection signal and said count signal, for providing a range signal corresponding to a range to the target, said ranging means including a memory register comprised of TTL technology; and
interface means for interfacing said TTL memory means and said ECL counting means.

13. Apparatus according to claim 12 further comprising an ECL control circuit coupled to said counting means.

14. Apparatus according to claim 12 wherein said ranging means includes a buffer memory coupled to said counting means.

* * * * *